United States Patent [19]

Ansel

[11] Patent Number: 4,496,686

[45] Date of Patent: Jan. 29, 1985

[54] RADIATION-CURABLE COATINGS CONTAINING REACTIVE PIGMENT DISPERSANTS

[75] Inventor: Robert E. Ansel, Des Plaines, Ill.

[73] Assignee: DeSoto, Inc., Des Plaines, Ill.

[21] Appl. No.: 607,790

[22] Filed: May 7, 1984

[51] Int. Cl.$^3$ ................................................ C08K 3/10
[52] U.S. Cl. ............................... 524/850; 204/159.22; 523/181; 524/785; 524/847; 524/854; 524/873; 526/301; 526/314; 526/318
[58] Field of Search ............... 524/785, 847, 850, 854, 524/873, 874, 780; 523/181; 204/159.22; 526/301, 318, 314

[56] References Cited

U.S. PATENT DOCUMENTS

| | | | |
|---|---|---|---|
| 4,075,141 | 2/1978 | Porter et al. | 524/879 |
| 4,203,875 | 5/1980 | Garner et al. | 524/873 |
| 4,296,020 | 10/1981 | Magrans | 524/452 |
| 4,304,690 | 12/1981 | Schulze et al. | 252/524 |
| 4,304,889 | 12/1981 | Waddill et al. | 525/514 |
| 4,342,840 | 8/1982 | Kozawa et al. | 524/850 |
| 4,427,823 | 1/1984 | Inagaki et al. | 524/854 |

*Primary Examiner*—Herbert J. Lilling
*Attorney, Agent, or Firm*—Dressler, Goldsmith, Shore, Sutker & Milnamow, Ltd.

[57] ABSTRACT

Liquid coating compositions adapted to be cured by exposure to penetrating radiation are disclosed in which a liquid vehicle of coating viscosity having an ethylenically unsaturated portion comprising one or more polyethylenically unsaturated materials adapted to cure on radiation exposure, pigment dispersed in the vehicle, and an ethylenically unsaturated radiation-curable dispersant containing a carboxyl group for wetting the pigment and assisting in the stable dipsersion of the pigment in the vehicle. This dispersant is a half amide or half ester of an ethylenically unsaturated polycarboxylic acid anhydride, such as maleic anhydride, with an organic compound having a molecular weight of from 100 to 4000 and which contains a single hydroxy group or a single amino group as the sole reactive group thereof.

12 Claims, No Drawings

RADIATION-CURABLE COATINGS CONTAINING REACTIVE PIGMENT DISPERSANTS

DESCRIPTION

TECHNICAL FIELD

This invention relates to radiation-curable pigmented coating composition in which the wetting of the pigment is facilitated by the presence of a dispersant which participates in the radiation cure. Electron beam radiation is particularly contemplated.

BACKGROUND ART

Radiation cure of ethylenically unsaturated coating compositions is well known. Ultraviolet radiation is particularly desirable for this purpose, but it does not penetrate opaque pigments very well. When the coating is to be extensively pigmented, as in coatings which are pigmented with magnetizable oxide particles to form magnetic recording structures, more penetrating ionizing radiation is desired, and electron beam radiation provides the preferred curing radiation. To provide good film properties, the unsaturated materials present in the coating composition include polyethylenically unsaturated materials, which are preferably oligomers. These polyethylenic materials, and especially those which are oligomers, possess poor wetting characteristics, so the grinding of the pigment into the polyethylenically unsaturated vehicle becomes a significant problem. If the pigment is not properly wetted and dispersed in the vehicle, it will not be uniformly dispersed in the cured film. Some progress has been made in providing polyethylenically unsaturated oligomers which possess improved wetting characteristics, but it is desired to maximize the pigment wetting capacity since this minimizes the difficulty of grinding the pigment into the polyethylenically unsaturated vehicle which is a time consuming and costly operation.

DISCLOSURE OF INVENTION

In accordance with this invention, a liquid coating composition adapted to be cured by exposure to ionizing radiation comprises, a liquid vehicle of coating viscosity comprising an ethylenically unsaturated portion comprising one or more polyethylenically unsaturated materials adapted to cure on radiation exposure, pigment dispersed in the vehicle, and an ethylenically unsaturated radiation-curable dispersant containing a carboxyl group capable of wetting the pigment and assisting in the stable dispersion of the pigment in the vehicle. This dispersant is a half amide or half ester of an ethylenically unsaturated polycarboxylic acid anhydride, such as maleic anhydride, with an organic compound having a molecular weight of from 100 to 4000 and which contains a single hydroxy group or a single amino group as the sole reaction group thereof. The organic compound provides an oleophylic end when reacted with the unsaturated polycarboxylic anhydride, and the anhydride opens to provide a carboxy group close to the ethylenic group provided by the anhydride. This carboxyl group wets the pigment and the oleophylic end is compatible with the ethylenically unsaturated materials, and this helps to disperse the pigment particles in the vehicle when the two are ground together. The organic compound is preferably a polyether to enhance compatibility with polyethylenically unsaturated oligomers which also preferably include polyether components.

Referring more particularly to the liquid vehicle of coating viscosity, the film-forming component is ethylenically unsaturated and it includes one or more polyethylenically unsaturated materials adapted to cure on radiation exposure to provide good film properties. These unsaturated materials are all conventional. It is preferred that the polyethylenically unsaturated materials be oligomeric to possess some significant molecular weight, but simple polyacrylates and polymethacrylates of polyhydric alcohols are acceptable. These are illustrated by ethylene glycol diacrylate, butylene glycol diacrylate, 1,6-hexane glycol diacrylate, the diacrylate of the adduct of two moles of ethylene or propylene oxide with one mole of neopentyl glycol, glycerin diacrylate, trimethylol propane diacrylate and triacrylate, pentaerythritol triacrylate and tetraacrylate, and $C_2$-$C_4$ alkylene oxide adducts of these polyhydric alcohols to provide higher molecular weight polyhydric alcohols having a molecular weight up to about 6,000 which are esterified with acrylic acid. The corresponding methacrylates formed by replacing acrylic acid with methacrylic acid are also useful.

The preferred polyethylenically unsaturated materials are low to moderate molecular weight oligomers having a small number of groups which are reacted, as with hydroxyethyl acrylate, to introduce terminal ethylenic groups. Oligomers having a molecular weight of from 500 to 20,000 and providing 2–10 hydroxy groups per molecule are preferred, especially those containing polyether groups held together by 4–20 urethane groups per molecule.

It is best to use polyethylenically unsaturated materials based on diisocyanates which contain hydroxy functionality because they are linked together with an at least trifunctional polyol, such as glycerin or trimethylol propane, or an amino alcohol containing at least one hydroxyl group and sufficient hydroxy and/or amino hydrogen atoms to react with all of the isocyanate functionality present, such as monoethanol amine. These are described in my prior application Ser. No. 571,190 filed Aug. 16, 1984, and products of this character are employed in the examples. In this way I combine a polyethylenically unsaturated oligomer having reasonable wetting characteristics with dispersants which further improve the pigment wetting.

The above oligomers are preferably hydroxy-functional diethylenically unsaturated polyurethanes produced by reacting a linear diisocyanate-terminated polycarbonate diol polyurethane oligomer having the formula:

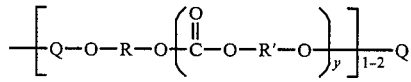

in which R is alkylene having 1–20 carbon atoms, such as ethylene, propylene or butylene; R' is the residue of an alkylene diol containing 2–12 carbon atoms, such as 1,4-butane diol or 1,6-hexane diol; Q is the residue of a diisocyanate, like isophorone diisocyanate; y is at least 1 and R' and y provide a molecular weight of 300–3000. These are produced as shown in the example and reacted with a deficiency of a monoethylenically unsaturated monohydric ester, such as 2-hydroxypropyl acrylate or 2-hydroxyethyl acrylate, to provide an oligomeric monoisocyanate having a monoethylenic group on one of its two ends. This oligomeric monoethylenic monoisocyanate, preferably in admixture with unreacted diisocyanate, is then reacted with enough at least trifunctional polyol or amino alcohol, as previously illustrated, to leave at least about one equivalent of hydroxy per mole of polyol or amino polyol used.

Other useful oligomers are polyurethanes formed by reacting 5 moles of polypropylene glycol of molecular weight 600 with 6 moles of isophorone diisocyanate and 2 moles of 2-hydroxyethyl acrylate.

Using a polysiloxane polycarbinol to further illustrate useful oligomers, these are available with a molecular weight of from 500 to 20,000, a molecular weight of 6,000 being typical, and can be reacted with acrylic acid to form a polyacrylate which possesses acrylic unsaturation. One can use an hydroxyalkyl acrylate or methacrylate in which the alkyl group contains from 2-4 carbon atoms, like 2-hydroxyethyl acrylate or methacrylate, and couple the unsaturated group to the carbinol group as an ether. One can also react the 2-hydroxyethyl acrylate or methacrylate with a molar proportion of a diisocyanate, like isophorone diisocyanate, to provide an unsaturated monoisocyanate which can be coupled to the carbinol group by urethane formation.

The term "polyacrylate" is here used to denote a plurality of acrylic acid ester groups, and this is one accepted use of this term.

One can also use polyepoxide polyesters with acrylic or methacrylic acid. Suitable polyepoxides are illustrated by diglycidyl ethers of bisphenols, like bisphenol A, having a molecular weight of from about 350 to about 7,000. A diglycidyl ether of bisphenol A having a molecular weight of about 1,000 and reacted with two molar proportions of acrylic acid provides a preferred illustration.

All sorts of other oligomers having from 2-10 reactive groups per molecule can be used, such as polyesters. Thus, hydroxy-functional polyesters made by polyesterifying a dicarboxylic acid, like phthalic or adipic acids, with a small excess of diol, like ethylene glycol or 1,4-butane diol, will provide a low molecular weight polymer which can be converted to a polyacrylate in the same fashion as explained with reference to the polysiloxane polycarbinols. A proportion of trifunctional material, such as trimethylol propane or trimellitic acid or anhydride, may be included in the polyester to increase its functionality.

As will be evident, a polyethylenically unsaturated material which will polymerize on radiation exposure is necessary to provide good film properties, but its selection is conventional and is not a feature of this invention. The lower its molecular weight, the greater its liquidity, and the smaller the proportions of other reactive and nonreactive liquids which are needed to lower the viscosity to where the liquid mixture can be applied as a coating. It is preferred that at least 30%, preferably at least 50% of the ethylenically unsaturated portion of the coating composition be polyethylenic.

It is also desirable to reduce the viscosity of the coating composition by having present at least 10% of the ethylenically unsaturated portion of the coating of monoethylenically unsaturated liquid. These are available in many different types and will be selected based on their reactivity, their glass transition temperature, and their other characteristics. Suitable liquid monomers which can be used are methyl acrylate, 2-hydroxyethyl acrylate, phenoxyethyl acrylate, methyl methacrylate, 2-ethylhexyl acrylate, ethoxy ethoxyethyl acrylate, isobornyl acrylate, and the corresponding methacrylates.

It will be understood that the acrylates are more rapidly reactive and are preferred for that reason. On the other hand, the methacrylates form good films when appropriately exposed, and other monoethylenically unsaturated acids, like crotonic acid, are also useful, though less readily available.

The desired liquidity of the coating composition can also be obtained using inert volatile organic solvents, like acetone, butyl acetate or isopropanol. These solvents can be used alone or in admixture with one another, and are frequently present in pigmented systems containing a pigment to binder weight ratio in excess of 1:1 in an amount to reduce the total solids content of the pigmented coating to the range of from 25% to 60%.

The coating compositions of this invention are pigmented, preferably in a pigment to binder weight ratio of at least about 0.5:1. Many of these pigments will absorb ultraviolet light so that more penetrating ionizing radiation is needed for cure, especially electron beam radiation. Magnetic oxide particles are particularly desired since these allow the provision of magnetic recording structures, especially when used in a pigment to binder weight ratio of at least 2:1. Regardless of the purpose of the pigmented coating, the pigment must be uniformly ground into and wetted by the vehicle if a cured coating containing uniformly dispersed pigment is to be formed, and this is facilitated by the presence of the ethylenically unsaturated radiation-curable dispersants which are used herein.

A typical composition in this invention intended to be cured by electron beam exposure, contains a pigment to binder weight ratio of 3:1 and the dispersant is present in a proportion of 2%, based on the weight of the pigment. This composition would also include the inert volatile organic solvent to provide coating viscosity, this solvent reducing the total solids content of the pigmented coating to the range of 25% to 60%.

As will be understood, a prime purpose of pigmenting a coating composition is to provide an opaque coating with an attractive appearance, so titanium dioxide rutile is a preferred pigment. Additional colorants may be added to provide desired coloration, as is common knowledge in making paint.

Referring more particularly to the ethylenically unsaturated radiation-curable dispersants which are used herein, these are normally added to the liquid vehicle prior to pigmentation, but the proportion of the dispersant present may be measured either prior to or subsequent to incorporation of the pigment. The usual pigmented systems in this invention contain inert volatile organic solvent to provide the solids content previously noted. The pigment-free vehicle will contain from 1% to 20% of the dispersant, preferably from 3% to 16%. In the pigmented coating, the dispersant concentration is usually from 0.25% to 7%, preferably from 1% to 5%.

The dispersant, as previously indicated, is either a half amide or half ester of an ethylenically unsaturated polycarboxylic acid anhydride, such as maleic anhydride, with an organic compound having a molecular weight of from 100 to 4000 and which contains a single hydroxy group or a single amino group as the sole reactive group thereof. The anhydrides which may be used are further illustrated by itaconic anhydride, though maleic anhydride is preferred because of its availability and low cost.

Compounds having a single hydroxy group which may be used herein may be either saturated or unsaturated, but the saturated alcohols and polyether alcohols are less costly and still effective. Thus, butyl alcohol, 2-ethylhexyl alcohol, and alkylene oxide adducts thereof in which the alkylene group contains from 2-4 carbon atoms, such as propylene oxide, will illustrate useful compounds. The preferred oligomers which provide the film-forming component of the liquid coatings of this invention frequently include polyethers of diols having from 2-4 carbon atoms, like polyethylene glycol and polypropylene glycol, held together in a polyurethane structure formed by reaction with a diisocyanate like isophorone diisocyanate. These are preferably used with dispersants which are made by reaction with a polyether so as to include a polyether structure in the hydrophobic portion of the dispersant and thereby provide enhanced compatibility in the pigmented coating composition.

The half amides are formed by reaction of an amine containing a single primary or secondary amine group with the dicarboxylic acid anhydride. Suitable amines are butyl amine, octyl amine, dibutyl amine, and polyoxyalkylene amines containing from 2-4 carbon atoms in the alkylene group, such as polyoxypropylene amine having a molecular weight of about 600. This primary amine is a preferred material, and it will be used in the examples.

The reaction between the dicarboxylic acid anhydride and the monoalcohol or monoamine is a simple adduction reaction which is itself well known and which proceed smoothly to completion by opening the anhydride ring. The product carries a carboxyl group which provides superior pigment wetting characteristics.

This invention is illustrated in the examples which follow, it being understood that throughout this application all parts and proportions are by weight, unless otherwise specified.

EXAMPLE 1

There were charged to a 250 ml three neck round bottom flask equipped with a thermometer, distilling column, heating mantle, magnetic stirrer, distilling head, air condenser, receiver and vacuum attachments, 45 grams of 1,4-butanediol, 85.6 grams of diphenyl carbonate and 0.1 gram of sodium hydroxide. The flask was evacuated to a pressure of about 10 mm Hg and the mixture was stirred and heated to about 100° C. and kept at these conditions for about three hours during which slow phenol distillation was observed. After three hours the pressure was reduced to 1 mm Hg and the temperature raised to 120° C. for 1 hour to complete the phenol distillation. After 1 hour the residue was cooled to room temperature and acetic acid was added dropwise until the mixture was neutralized. A distillate of 75.5 grams of phenol and a residue of 53.2 grams of a polymeric carbonate diol having a number average molecular weight of 554 was recovered.

The polycarbonate produced above is a linear polymer having one hydroxyl group at each end thereof, so it is a polycarbonate diol.

EXAMPLE 2

4 mole of the polycarbonate diol of Example 1 is reacted with 8 moles of bis(4-isocyanatocyclohexyl) methane (Desmodur W may be used), the reaction being carried out at 50% solids content in tetrahydrofuran solvent in the presence of 0.1% of dibutyl tin dilaurate catalyst at 50° C. for 2 hours. Then, 2 moles of 2-hydroxyethyl acrylate are added to the solution and the mixture is held at 50° C. for 1 hour. Then, 3 moles of glycerine are added and the reaction is continued for another hour at 50° C. The result is a solution containing a diacrylate polyurethane oligomer in which the isocyanate functionality is consumed and the secondary hydroxyl group in the glycerin is retained.

EXAMPLE 3

Polyoxypropylene amine having a molecular weight of about 600 (Jeffamine M-600 may be used from Jefferson Chemical Company) is adducted with maleic anhydride using equimolar proportions to form the half amide. This is done by charging all the maleic anhydride and an equiweight proportion of the amine to a reactor which is stirred while the contents are heated to 70° C., at which point the maleic anhydride begins to melt and dissolve as it reacts. The reaction is exothermic, so heating is only used when needed to maintain the temperature. When the solution is clear, the balance of the amine is added slowly (over a 15 minute period) and the temperature is maintained at 75° C.–80° C. until a clear final product is obtained.

EXAMPLE 4

75.2 parts of the diacrylate polyurethane oligomer of Example 2 is combined with 6 parts of the half amide of Example 3, 18.8 parts of pentaerythritol triacrylate. The resulting mixture can be pigmented with magnetizable iron oxide pigment to a pigment to binder ratio of 3:1. As the grind proceeds, more tetrahydrofuran is added to a final solids content of 52%. The pigment ground easily into the vehicle to produce a coating composition of coating viscosity, and the electron beam-cured films were uniformly pigmented. In comparison with the same system without the dispersant, the grind is about 25% faster, and the cured films have higher gloss and are smoother-surfaced. The dispersant is not observable on the surface of the film.

What is claimed is:

1. A liquid coating composition adapted to be cured by exposure to ionizing radiation comprising, a liquid vehicle of coating viscosity having an ethylenically unsaturated portion comprising one or more polyethylenically unsaturated materials adapted to cure on radiation exposure, pigment dispersed in said vehicle, and an ethylenically unsaturated radiation-curable dispersant containing a carboxy group for wetting said pigment and assisting in the stable dispersion of said pigment in said vehicle, said dispersant being a half amide or half ester of an ethylenically unsaturated polycarboxylic acid anhydride with an organic compound having a molecular weight of from 100 to 4000 and which contains a single hydroxy group or a single amino group as the sole reactive group thereof.

2. A liquid coating composition as recited in claim 1 in which said polyethylenically unsaturated material comprises a polyether, and said organic compound is a polyether.

3. A liquid coating composition as recited in claim 1 in which said ethylenically unsaturated polycarboxylic acid anhydride is maleic anhydride.

4. A liquid coating composition as recited in claim 1 in which said polyethylenically unsaturated material comprise oligomers having a molecular weight of from 500 to 20,000 and providing from 2–10 hydroxy groups per molecule.

5. A liquid coating composition as recited in claim 4 in which said oligomers comprise polyether groups held together by from 4–20 urethane groups per molecule.

6. A liquid coating composition as recited in claim 4 in which said oligomers comprise hydroxy-functional diethylenically unsaturated polyurethanes.

7. A liquid coating composition as recited in claim 1 in which said polyethylenically unsaturated material comprise polyacrylates and polymethacrylates of polyhydric alcohols having from 2–4 hydroxy groups per molecule.

8. A liquid coating composition as recited in claim 1 in which at least 30% of the ethylenically unsaturated portion of the coating composition is constituted by said polyethylenically unsaturated material.

9. A liquid coating composition as recited in claim 8 in which the viscosity of the coating composition is reduced by having of at least 10% of the ethylenically unsaturated portion of the coating composition constituted by monoethylenically unsaturated liquid.

10. A liquid coating composition as recited in claim 1 containing pigment in a pigment to binder weight ratio in excess of 1:1 and inert volatile organic solvent in an amount to reduce the total solids content of the pigmented coating composition to the range of from 25% to 60%.

11. A liquid coating composition as recited in claim 9 containing pigment in a pigment to binder weight ratio in excess of 1:1 and inert volatile organic solvent in an amount to reduce the total solids content of the pigmented coating composition to the range of from 25% to 60%.

12. A liquid coating composition as recited in claim 1 containing pigment in a pigment to binder weight ratio in excess of 0.5:1 and from 0.25% to 7% of said dispersant.

* * * * *